United States Patent [19]

Sullivan et al.

[11] 3,855,281

[45] Dec. 17, 1974

[54] STABLE COMPOSITIONS FOR INHIBITING POLYMERIZATION OF UNSATURATED CARBOXYLIC ACID ESTERS

[75] Inventors: Alfred Bax Sullivan, Wadsworth; Gene Ray Wilder, Medina, both of Ohio

[73] Assignee: Monsanto Company, St. Louis, Mo.

[22] Filed: Sept. 21, 1973

[21] Appl. No.: 399,437

[52] U.S. Cl.......... 260/486 R, 260/398.5, 260/485 S
[51] Int. Cl...................... C07c 69/54, C07c 69/52
[58] Field of Search.......... 260/486 R, 485 S, 398.5

[56] References Cited
UNITED STATES PATENTS 2,822,348  2/1958  Haslam .......................... 260/486 R
3,580,947  5/1971  Ikeda et al. .................... 260/486 R Primary Examiner—James A. Patten
Assistant Examiner—Paul J. Killos

[57] ABSTRACT

A method of inhibiting polymerization of unsaturated carboxylic acid esters and improved unsaturated carboxylic acid ester compositions are described. The method comprises, and the compositions are prepared by, incorporating into the ester composition a phenylenediamine of the formula

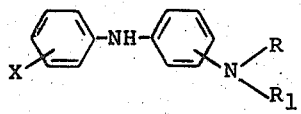

in which X is hydrogen, chloro, trichloromethyl, trifluoromethyl, nitro, lower alkyl, lower alkoxy or phenoxy and R and $R_1$ are alkyl or when X is hydrogen, R may be hydrogen when $R_1$ is tertiary alkyl or R and $R_1$ together with the nitrogen atom is a heterocycle selected from the group consisting of pyrrolidinyl, 2,5-dimethyl pyrrolidinyl, piperidino and hexahydro-1H-azepin-1-yl.

12 Claims, No Drawings

STABLE COMPOSITIONS FOR INHIBITING POLYMERIZATION OF UNSATURATED CARBOXYLIC ACID ESTERS

BACKGROUND OF THE INVENTION

This invention relates to methods of inhibiting polymerization of unsaturated monomers, more particularly it relates to methods of inhibiting unsaturated carboxylic acid esters and to improved unsaturated carboxylic acid ester compositions. Processes concerning the preparation and the stabilization of unsaturated carboxylic esters are found in Patent Office Class 260 subclass 486.

Substantial quantities of unsaturated carboxylic acid esters, for example methyl methacrylate, are manufactured for use as intermediates in the production of polymers and copolymers. During manufacture, transportation and storage of these esters, it is essential that polymerization of these monomers is avoided. If premature polymerization occurs during manufacture, the polymer fouls or completely plugs production equipment and transfer lines which fouling leads to expensive dismantling and cleaning of production facilities. The problem is particularly acute during the distillation step which step is required to isolate the desired ester monomer. If premature polymerization occurs during transportation or storage, recovery of the polymer from the storage vessel is extremely difficult. Of course, any time that premature polymerization occurs, the yield of the desired monomer is reduced. It is common practice to add stabilizers to unsaturated esters to assure inhibition of polymerization. Preferred polymerization inhibitors not only prevent premature polymerization they do not unduly interfere with the desired polymerization reaction or affect the polymer properties in any way. In polymer production, the effect of polymerization inhibitors is generally reduced by addition of polymerization initiators. Known polymerization inhibitors include phenols (hydroquinone being commonly used) and aliphatic and aromatic amines, for example, phenylenediamines. The subject invention concerns an improved class of phenylenediamine inhibitors.

SUMMARY OF THE INVENTION

We have discovered a class of N-aryl-o or -p-phenylenediamines which possesses enhanced activity in respect to inhibiting the polymerization of unsaturated carboxylic acid esters. It has been found that inhibitor activity depends upon the nature and the position of the nitrogen substituents. The improved inhibitors of this invention are characterized by the formula

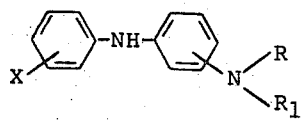

in which X is hydrogen, chloro, trichloromethyl, trifluoromethyl, nitro, lower alkyl, lower alkoxy or phenoxy and R and $R_1$ are alkyl or when X is hydrogen, R may be hydrogen when $R_1$ is tertiary alkyl or R and $R_1$ together with the nitrogen atom is a heterocyclic radical selected from the group consisting of pyrrolidinyl, 2,5-dimethyl pyrrolidinyl, piperidino and hexahydro-1H-azepin-1-yl. Inhibitors in which X is hydrogen and the amino groups are in the para position (N-phenyl-p-phenylenediamines) comprise a preferred sub-class. Branched and unbranched primary, secondary and tertiary alkyl radicals are satisfactory.

The nature of the R and $R_1$ radicals is important for improved results. For example, for enhanced inhibitor activity, both valences of the nitrogen must be satisfied by alkyl radicals, peferably of 1–5 carbon atoms, or one valence may be satisfied with hydrogen if the other valence is tertiary alkyl. When R and $R_1$ are joined forming a single polymethylene radical so that they, together with the nitrogen atom, form a heterocycle, enhanced inhibitor activity is obtained when the heterocyclic radical is pyrrolidinyl, 2,5-dimethylpyrrolidinyl and hexahydro-1H-azepin-1-yl. A preferred class of inhibitors comprises compounds in which the sum of the number of carbon atoms of R and $R_1$ is 2–10 because when the number of carbon atoms exceeds ten, diminished inhibitor activity results due to the increase in molecular weight.

The terms used herein and in the claims mean as follows: "Alkyl" means the radical derived from removal of one hydrogen atom from alkane. Illustrative examples of satisfactory alkyl radicals are methyl, ethyl, propyl, n-butyl, isobutyl, sec-butyl, tert-butyl, hexyl, 1,3-dimethylbutyl, heptyl, 1,4-dimethylpentyl, 2-ethylhexyl, octyl, and tert-octyl(1,1,3,3,-tetramethylbutyl). The term "lower alkyl" means alkyl radicals of 1–5 carbon atoms which radicals are a preferred subgroup of the invention.

The term "unsaturated carboxylic acid esters" is used in the generic sense and means aliphatic esters of unsaturated mono-, di-, and tricarboxylic acids. Lower alkyl esters of ethylenically unsaturated monocarboxylic acids are preferred. The size of the carboxylic acid or ester moiety is immaterial. Polymerization of esters of unsaturated carboxylic acids of 30 carbon atoms or more are inhibited with the inhibitors of this invention. Illustrative examples of compounds stabilized with the inhibitors of this invention are the methyl, ethyl, butyl, and 2-ethylhexyl esters of the following acids: acrylic, methacrylic, angelic, crotonic, isocrotonic, propynoic, sorbic, oleic, elaidic, linoleic, $\alpha$-eleostearic, $\beta$-eleostearic, $\alpha$-linolenic and erucic. Other examples are the dimethyl, diethyl, dibutyl, and di(2-ethylhexyl) esters of maleic acid, fumaric acid, itaconic acid and acetylenedicarboxylic acid, and trialkyl esters of aconitic-(1,2,3-propenetricarboxylic) acid. A preferred subgroup of unsaturated carboxylic acid esters are acrylate esters derived from acrylic and methacrylic acids. These esters are characterized by the formula $CH_2=C(R_2)C(O)OR_3$ in which $R_2$ is hydrogen or methyl and $R_3$ is alkyl of 1–8 carbon atoms. Lower alkyl esters are preferred.

The inhibitors of this invention are prepared by known procedures. For example, N,N-dialkyl-N'-phenyl-o- or p-phenylenediamines may be prepared by the reductive alkylation of 2 or 4-nitro-diphenylamine using two moles of the appropriate aldehyde per each mole of amine. N,N-dialkyl-N'-substituted-phenyl-o- or p-phenylenediamines may be prepared by the reductive alkylation of 2 or 4-nitro-2' or 4'-substituted-diphenylamine using two moles of the appropriate aldehyde per each mole of amine. The alkylation is carried out with hydrogen in the presence of a noble metal catalyst. N'-tert-alkyl-N'-phenyl-o- or p- phenylenediamines and N-(2- or 4-anilinophenyl)-heterocyclicamines may be conveniently prepared by the reaction of N-tert-alkyl-o- or p-nitroaniline and N-(o- or p-nitrophenyl)heterocyclicamine respectively, with cyclohexanone in the presence of palladium catalyst. Kilbourne, et al., U.S. Pat. No. 3,219,703 Nov. 23, 1965. Additional details on the preparation of the inhibitors may be found in Oberster et al, *Canadian Journal of Chemistry*, 45(3), 195–201 (1967) and Stahly U.S. Pat. No. 3,391,107, July 2, 1968.

Examples of satisfactory dialkyl inhibitors are:
N,N-dimethyl-N'-phenyl-p-phenylenediamine
N,N-diethyl-N'-phenyl-p-phenylenediamine
N,N-dipropyl-N'-phenyl-p-phenylenediamine
N,N-di-n-butyl-N'-phenyl-p-phenylenediamine
N,N-di-sec-butyl-N'-phenyl-p-phenylenediamine
N,N-di-n-pentyl-N'-phenyl-p-phenylenediamine N,-N-di-n-hexyl-N'-phenyl-p-phenylenediamine
N,N-di-n-octyl-N'-phenyl-p-phenylenediamine
N-methyl-N-ethyl-N'-phenyl-p-phenylenediamine
N-methyl-N-propyl-N'-phenyl-p-phenylenediamine
N-methyl-N-isopropyl-N'-phenyl-p-phenylenediamine
N-methyl-N-n-butyl-N'-phenyl-p-phenylenediamine
N-methyl-N-sec-butyl-N'-phenyl-p-phenylenediamine
N-methyl-N-isobutyl-N'-phenyl-p-phenylenediamine
N-methyl-N-tert-butyl-N'-phenyl-p-phenylenediamine
N-methyl-N-n-pentyl-N'-phenyl-p-phenylenediamine
N-methyl-N-hexyl-N'-phenyl-p-phenylenediamine
N-methyl-N-octyl-N'-phenyl-p-phenylenediamine
N-ethyl-N-propyl-N'-phenyl-p-phenylenediamine
N-ethyl-N-isopropyl-N'-phenyl-p-phenylenediamine
N-ethyl-N-n-butyl-N'-phenyl-p-phenylenediamine
N-ethyl-N-n-phenyl-N'-phenyl-p-phenylenediamine
N-ethyl-N-octyl-N'-phenyl-p-phenylenediamine
propyl-N-n-butyl-N'-phenyl-p-phenylenediamine
N-propyl-N-sec-butyl-N'-phenyl-p-phenylenediamine and the corresponding ortho-phenylenediamines.

Examples of satisfactory N,N-dialkyl-N'-substituted-phenyl inhibitors are:
N,N-dimethyl-N'-(p-tolyl)-p-phenylenediamine
N,N-dimethyl-N'-(4-methoxyphenyl)-p-phenylenediamine
N,N-dimethyl-N'-(4-ethoxyphenyl)-p-phenylenediamine
N,N-dimethyl-N'-(4-nitrophenyl)-p-phenylenediamine
N,N-dimethyl-N'-(p-tolyl)-o-phenylenediamine
N,N-dimethyl-N'-(4-methoxyphenyl)-o-phenylenediamine
N,N-dimethyl-N'-(4-ethoxyphenyl)-o-phenylenediamine
N,N-diethyl-N'-(p-tolyl)-p-phenylenediamine
N,N-diethyl-N'-(4-methoxyphenyl)-p-phenylenediamine
N,N-diethyl-N'-(4-ethoxyphenyl)-p-phenylenediamine
N,N-diethyl-N'-(4-nitrophenyl)-p-phenylenediamine
N,N-dipropyl-N'-(p-tolyl)-p-phenylenediamine Suitable tert-alkyl inhibitors are N-tert-butyl-N'-phenyl-p-phenylenediamine, N-tert-amyl-N'-phenyl-p-phenylenediamine and N-tert-octyl-N'-phenyl-p-phenylenediamine.

Satisfactory heterocyclicamino inhibitors are N-(4-anilinophenyl)pyrrolidine, N-(4-anilinophenyl)-2,5-dimethylpyrrolidine, 1-(4-anilinophenyl)piperidine and 1-(4-anilinophenyl)hexahydro-1H-azepine.

The inhibitors are incorporated into unsaturated carboxylic acid ester compositions by simple addition. Normally, the inhibitor is added to the reactor after the ester is prepared but prior to distilling the reaction mixture to isolate the unsaturated ester from by-products and reaction media. Generally, additional quantities of inhibitor are added to the ester fraction recovered after distillation to inhibit polymerization during storage. Although the effect of the inhibitors are discussed in terms of inhibiting polymerization, it is probably more accurate to think of the inhibition effect as extending the induction period prior to the onset of polymerization rather than affecting polymerization rate. Regardless of the mode of operation, the consequence of the inhibitor addition is a more stable unsaturated carboxylic acid ester monomer composition which remains in monomer form longer than a similar ester composition without inhibitor added.

The inhibitor effect is concentration dependent, i.e., the more inhibitor added the longer the time period before the onset of polymerization. The N-phenyl-p-phenylenediamine inhibitors of this invention are particularly potent. Quantities of one part per million by weight or less based upon the weight of ester are sufficient to inhibit polymerization. Normally, 5–50 parts per million are recommended for most applications with amounts of 50–200 parts per million being used sometimes and 200–5,000 parts per million being used where more severe conditions are encountered which require greater inhibition. Although even larger quantities are effective, higher dosages are usually unnecessary and are avoided for reason of economy. The amount required for any desired induction time may be readily determined by the methods hereinafter described.

The "onset time", the time from the beginning of the test until polymerization begins, may be conveniently determined either by measuring the temperature of a sample to detect the liberation of heat which takes place when polymerization begins or by measuring the change in volume of a sample to detect the volume reduction which takes place as polymerization proceeds. Either method is applicable to uncatalyzed samples or samples to which polymerization initiator is added. The exothermic method is described by Bockstahler, et al., *Ind. and Eng. Chem.*, 50 (10), 1581. The dilatometric method is described by Caldwell and Ihrig, *J. Am. Chem. Soc.*, 84, 2886.

The inhibitors of this invention are evaluated by the exothermic method essentially as described by Bockstahler, et al., supra. The time required for a test monomer to begin to polymerize is determined at elevated temperature. The test is based on the principle that polymerization is exothermic so that initiation is detected by observing temperature change between a test sample and a stable reference sample maintained in the same environment. The procedure comprises placing a test tube (adapted to accommodate a thermocouple) containing a measured amount of monomer in a constant temperature bath (maintained within ± 0.25°C). A similar test tube containing silicone oil is used as a reference sample. A differential thermocouple continuously measures the difference in the temperature ΔT between the test and reference samples. All samples are measured in the dark to eliminate any effects due to light. The thermocouple output is recorded on a strip recorder thereby providing a record of ΔT versus time. When polymerization occurs a sharp deflection in ΔT is observed from which the onset time is determined.

DESCRIPTION OF PREFERRED EMBODIMENTS

Ethylmethacrylate is the test monomer used to illustrate the effect of the inhibitors of the invention. A supply of ethylmethacrylate containing hydroquinone inhibitors is repeatedly washed with 0.5 N sodium hydroxide solution and finally with water to remove all hydroquinone inhibitor from the material. Fifty grams of the unstabilized ethylmethacrylate is added to an above described test tube. A solution of inhibitor is prepared by adding a carefully weighed quantity (0.25–0.30 g) of a N-phenyl-p-phenylenediamine to 10 ml of unstabilized ethylmethacrylate. The appropriate volume of inhibitor solution is then added to the test sample with a micropipette to give an inhibitor concentration of 5 parts per million. The test is placed in a constant temperature bath at 85°C and the onset time is determined as previously described. The onset time is recorded in hours. When the test is repeated with the same inhibitor, the average onset time is reported. The results obtained with a number of inhibitors are shown in Table I. Sample 1 is a control consisting of ethylmethacrylate with no inhibitor present. Sample 2 contains a known p-phenylenediamine inhibitor and the remainder of the samples contain inhibitors of this invention.

been added as initiator. It is understood that the inhibitors are effective in mixtures of different esters and also that mixtures of two or more inhibitors may be used to inhibit polymerization. Similar inhibitor activity is obtained with the o-phenylenediamine compounds of the invention.

Although the invention has been illustrated by typical examples, it is not limited thereto. Changes and modifications of the examples of the invention herein chosen for purposes of disclosure can be made which do not constitute departure from the spirit and scope of the invention.

The embodiments of the invention in which an exclusive property or privilege is claimed are defined as follows:

1. A monomer composition consisting essentially of unsaturated carboxylic acid ester and, in amount effective to inhibit polymerization of the ester, an inhibitor of the formula

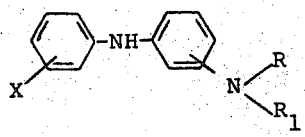

in which X is hydrogen, chloro, trichloromethyl, trifluoromethyl, nitro, lower alkyl, lower alkoxy, or phenoxy and R and $R_1$ are lower alkyl or when X is hydrogen, R may be hydrogen when $R_1$ is tertiary alkyl or R and $R_1$ together with the nitrogen atom is a heterocyclic radical selected from the group consisting of pyrrolidi-

TABLE I

| Sample No. | Inhibitor (5 ppm) | Onset time hours |
|---|---|---|
| 1 | None | 7 |
| 2 | N-isopropyl-N'-phenyl-p-phenylenediamine, m.p. 80°C | 51 |
| 3 | N-methyl-N-isopropyl-N'-phenyl-p-phenylenediamine, m.p. 62–63°C | 105 |
| 4 | N,N-dimethyl-N'-phenyl-p-phenylenediamine, m.p. 130–131°C | 137 |
| 5 | N,N-diethyl-N'-phenyl-p-phenylenediamine, m.p. 88–89°C | 118 |
| 6 | N-tert-butyl-N'-phenyl-p-phenylenediamine, m.p. 71–72°C | 109 |
| 7 | N,N-di-isobutyl-N'-phenyl-p-phenylenediamine, liquid | 88 |
| 8 | N,N-dimethyl-N'-(p-methoxyphenyl)-p-phenylenediamine, m.p. 74–75°C | 133 |
| 9 | N-tert-amyl-N'-phenyl-p-phenylenediamine, m.p. 44–45°C | 119 |
| 10 | N,N-dimethyl-N'-(p-tert-butylphenyl)-p-phenylenediamine, m.p. 94–95°C | 112 |
| 11 | 1-(4-anilinophenyl)hexahydro-1H-azepine, m.p. 88–89°C | 113 |
| 12 | 1-(4-anilinophenyl)pyrrolidine, m.p. 137–138°C | 91 |
| 13 | 1-(4-anilinophenyl)piperidine, m.p. 98–99°C | 85 |

Comparison of Samples 2 and 3 demonstrates that the presence of a methyl radical on the nitrogen unexpectedly doubles the inhibiting activity of the p-phenylenediamine. Comparison of Sample 2 and 6 demonstrates surprisingly that going from a secondary alkyl nitrogen substituent to a tert-alkyl nitrogen substituent also doubles the activity of the inhibitor.

Shorter onset times but about the same relative inhibitor activity is observed with acrylate samples to which measured amounts of 2,2'-azobis-(isobutyronitrile) has nyl, 2,5-dimethylpyrrolidinyl, piperidino and hexahydro-1H-azepin-1-yl.

2. The composition of claim 1 in which the ester is a lower alkyl ester of an ethylenically unsaturated monocarboxylic acid.

3. The composition of claim 2 in which the sum of the carbon atoms of R and $R_1$ is 2–10 and the amount of inhibitor is about 5–50 parts per million parts of ester.

4. The composition of claim 3 in which the inhibitor is a p-phenylenediamine and X is hydrogen.

5. The composition of claim 4 in which R and $R_1$ are lower alkyl.

6. The composition of claim 5 in which R and $R_1$ are methyl.

7. The composition of claim 4 in which R is hydrogen and $R_1$ is tert-alkyl.

8. The composition of claim 7 in which $R_1$ is tert-butyl.

9. The composition of claim 7 in which $R_1$ is tert-amyl.

10. The composition of claim 4 in which

is hexahydro-1H-azepin-1-yl.

11. The composition of claim 4 in which

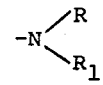

is pyrrolidinyl.

12. The composition of claim 4 in which the ester is an acrylate.

* * * * *